United States Patent [19]

Kotatsu

[11] Patent Number: 5,414,837
[45] Date of Patent: May 9, 1995

[54] SYSTEM FOR DETERMINING AND RETURNING FREQUENLY REQUESTED INFORMATION BY AN ALTERNATE PATH IN A DISTRIBUTED DATABASE

[75] Inventor: Nobuo Kotatsu, Yokohama, Japan

[73] Assignee: Hitachi, Ltd., Tokyo, Japan

[21] Appl. No.: 704,084

[22] Filed: May 22, 1991

[30] Foreign Application Priority Data

May 23, 1990 [JP] Japan .................. 2-133616

[51] Int. Cl.$^6$ .............................. G06F 15/40
[52] U.S. Cl. ........................... 395/600; 348/7;
364/DIG. 1; 364/282.1; 364/282.4; 364/283.4
[58] Field of Search ............. 364/200; 395/600; 348/7

[56] References Cited

U.S. PATENT DOCUMENTS

| | | | |
|---|---|---|---|
| 4,186,438 | 1/1980 | Benson et al. | 364/200 |
| 4,549,219 | 10/1985 | Sue et al. | 358/405 |
| 4,689,683 | 8/1987 | Efron | 348/722 |
| 4,734,764 | 3/1988 | Polock et al. | 348/7 |
| 4,803,614 | 2/1989 | Banba et al. | 395/275 |
| 4,843,546 | 6/1989 | Yoshida et al. | 364/403 |
| 4,845,658 | 7/1989 | Gifford | 395/275 |
| 5,091,849 | 2/1992 | Davis et al. | 395/100 |
| 5,093,718 | 3/1992 | Hoarty et al. | |

FOREIGN PATENT DOCUMENTS

| | | |
|---|---|---|
| 361974 | 4/1990 | European Pat. Off. . |
| 85947 | 9/1987 | Japan . |
| 1149125 | 6/1989 | Japan . |
| 1166230 | 6/1989 | Japan . |
| 211727 | 2/1990 | Japan . |

*Primary Examiner*—Thomas G. Black
*Assistant Examiner*—Wayne Amsbury
*Attorney, Agent, or Firm*—Antonelli, Terry, Stout & Kraus

[57] ABSTRACT

An information service system includes a terminal for generating a terminal inquiry to receive a remote response. The system further comprises host unit including a host database for storing information of a first plurality of items, for returning a host response, having information regarding at least one item corresponding to the terminal inquiry from among the information of the first plurality of items, in response to the terminal inquiry. The host database also selecting items having high occurrence frequencies of inquiries from among the first plurality of items. Furthermore, a remote unit is connected to the terminal and the host unit and includes a remote database for storing information, as information of a second plurality of items, information of the items selected by the host unit in the remote database. The remote database information is used for determining whether or not a response to the terminal inquiry is present within the information of the second plurality of items. The host unit returns, to the terminal, the remote response when it is determined that the response to the terminal inquiry is present within the information of the second plurality of items. On the other hand, the host unit also transmits the terminal inquiry, as the remote inquiry, to the host unit to return the host response to the terminal as the remote response when it is determined that the response is not present within the information of the second plurality of items.

6 Claims, 6 Drawing Sheets

FIG. 2

| INQUIRY COUNT ORDER 109a | DATA ITEM (CODE) 109b | CHANGE OCCURRING FLAG 109c | UPDATED INQUIRY COUNT 109d |
|---|---|---|---|
| 1 | AAAAA | 1 | $X_{1t}$ |
| 2 | BBBBB | 1 | $X_{2t}$ |
| 3 | CCCCC | 0 | $X_{3t}$ |
| ⋮ | ⋮ | ⋮ | ⋮ |
| m | | | $X_{mt}$ |
| TOTAL | — | — | SUM t |

| DATA ITEM (CODE) 111a | SERVICE FLAG FOR REMOTE DATABASE 111b | INQUIRY COUNT 111c |
|---|---|---|
| AAAAA | 1 | 25 |
| BBBBB | 0 | 3 |
| CCCCC | 1 | 12 |
| ⋮ | ⋮ | ⋮ |

111

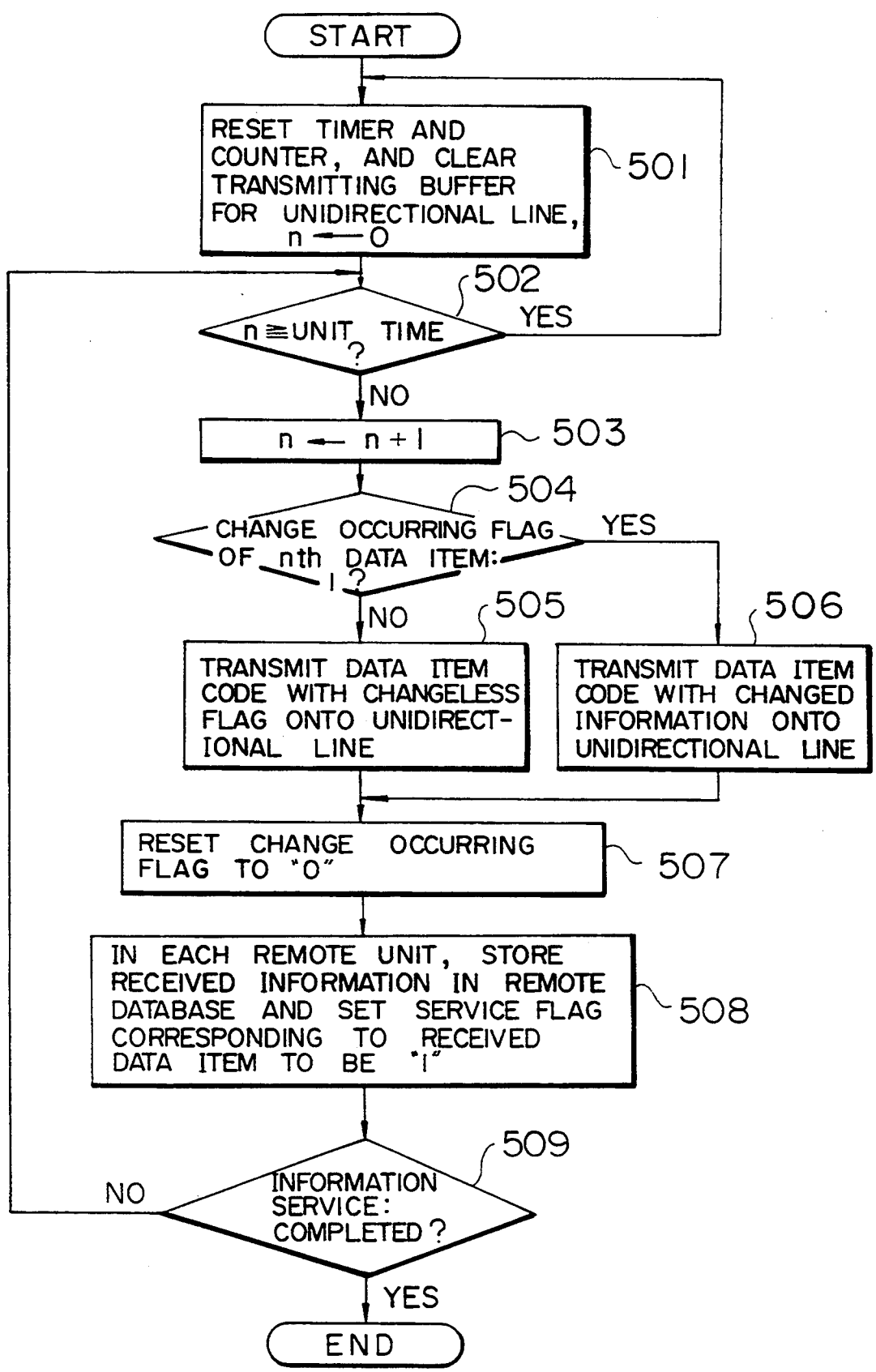

SYSTEM FOR DETERMINING AND RETURNING FREQUENLY REQUESTED INFORMATION BY AN ALTERNATE PATH IN A DISTRIBUTED DATABASE

BACKGROUND OF THE INVENTION

1. Field of the Invention

The present invention relates to an inquiry/response information service system, and more particularly to distributed processing of an inquiry transaction from a terminal.

2. Description of Related Art

In a conventional inquiry/response information service system, a centralized processing method has been adopted. Generally, a host computer responds to all inquiries from terminals to supply desired information to the terminals. An information service system of this type is described, for example, in JP-A-62-211727. According to the conventional method, a host computer responds to all inquiries from terminals so that if many inquiry transactions from terminals occur during a short, concentrated time period, a response time per one transaction becomes slow, resulting in poor service.

SUMMARY OF THE INVENTION

It is an object of the present invention to provide a method for responding to inquiries and a corresponding information service system, capable of reducing a load on a host computer, improving the throughput of the whole system, and minimizing the deterioration of service even if many inquiry transactions occur during a short, concentrated time period.

It is another object of the present invention to provide a method for efficiently processing an inquiry and an inquiry/response information service system using the method. The system includes a plurality of terminals and remote units, and a host computer, wherein each remote unit receives, in advance, information of data items having a high inquiry occurrence frequency from the host computer, and stores the information. If the information corresponding to the data item inquired by a terminal is present within the stored information, the inquired information is responded to by the terminal, and if not, the inquiry is transferred to the host computer.

It is a further object of the present invention to provide a method for efficiently responding to an inquiry and a corresponding information service system using the method, in which a remote unit collects inquiry contents from terminals and transmits the contents to the host computer at regular time intervals or at a constant occurrence frequency of inquiries, and the host computer aggregates the inquiry contents transmitted from remote units and transmits information having a high inquiry occurrence frequency to remote units.

It is a still further object of the present invention to provide a method of efficiently processing an inquiry and a corresponding information service system using the method, wherein information having a high inquiry occurrence frequency is transmitted from the host computer to remote units using unidirectional lines different from an inquiry/response line.

It is a further object of the present invention to provide an information service system wherein a terminal is provided with the function of a remote unit.

In order to achieve the above objects of the present invention, there is provided an information service system which includes:

terminal means for generating an input inquiry as a terminal inquiry to receive a remote response;

host means including a host database for storing information of a first plurality of items, for returning, as a host response, information of at least one item corresponding to the input remote inquiry among the information of the first plurality of items in response to an input remote inquiry, and for selecting items having high occurrence frequencies of inquiries from among the first plurality of items; and remote means connected to the terminal means and the host means and including a remote database, for storing information, as information of a second plurality of items, information of the items selected by the host means in the remote database, for determining whether or not a response to the terminal inquiry from the terminal means is present within the information of the second plurality of items, for returning the response to the terminal means as the remote response when it is judged that the response to the terminal inquiry from the terminal means is present within the information of the second plurality of items, and for transmitting the terminal inquiry as the remote inquiry to the host means to return the host response returned from the host means to the terminal means as the remote response when it is determined that the response is not present within the information of the second plurality of items.

According to the present invention, at a terminal side (such as a remote unit, a terminal having a distributed processing function), the number of inquiries is counted for each data item, and the inquiry contents are transmitted to a host computer at regular time intervals or at a constant occurrence frequency of inquiries. The host computer aggregates the inquiry contents transmitted from the terminal side, and transmits information having high occurrence frequencies of inquires to terminals, for example, via unidirectional lines different from an inquiry/response line. Upon occurrence of an inquiry at the terminal side, the inquiry is responded locally by using the stored information previously transmitted from the host computer. In this way, inquiry transactions to the host computer can be reduced, thereby improving the throughput of the whole system.

BRIEF DESCRIPTION OF THE DRAWINGS

FIG. 2 shows the details of a host inquiry managing table at a host computer;

FIG. 3 shows the details of a remote inquiry managing table at a remote unit;

FIG. 7 is a flow chart illustrating the operation of unidirectionally transmitting information from the host computer to a remote unit via another line.

DESCRIPTION OF THE PREFERRED EMBODIMENT

An information service system according to an embodiment of the present invention will be described with reference to the accompanying drawings.

Figure 1:
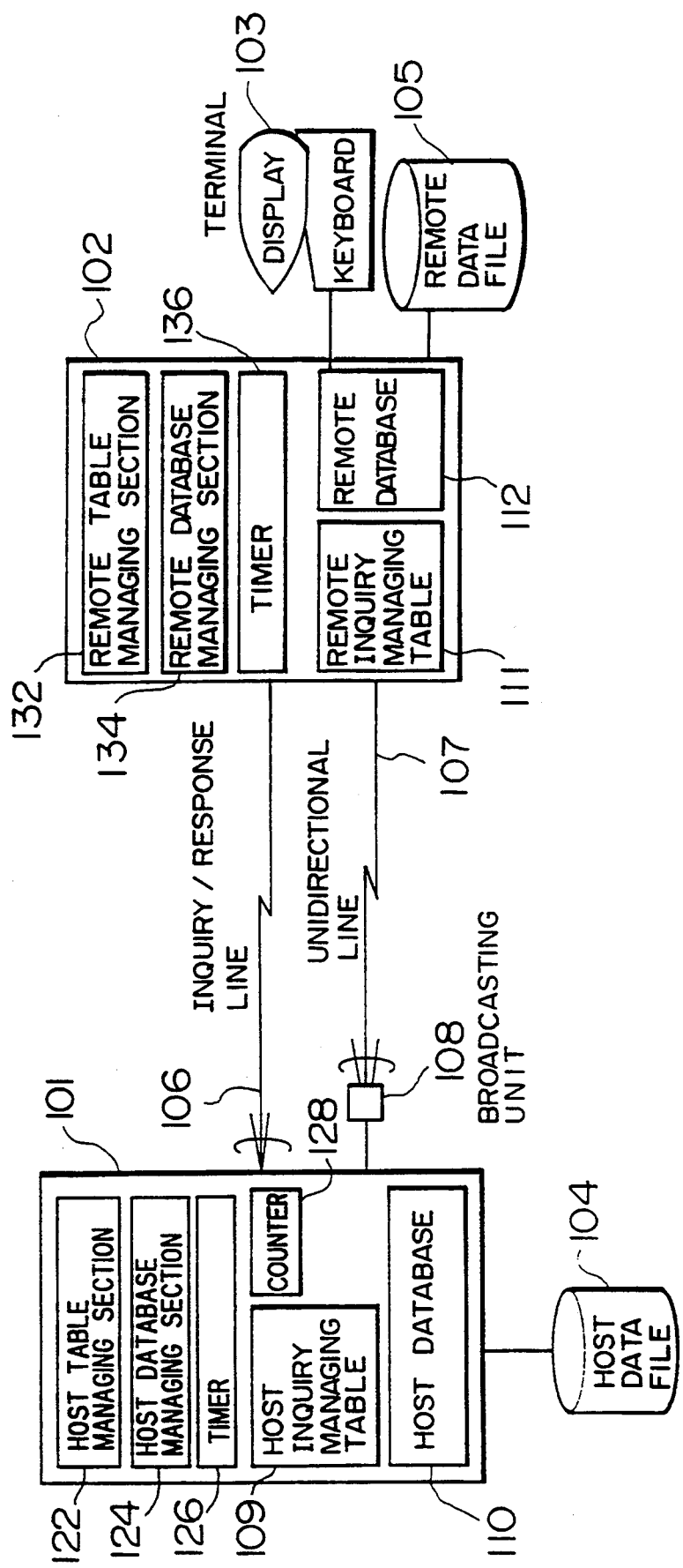
FIG. 1 shows the overall structure of an inquiry/response information service system according to an embodiment of the present invention.

FIG. 1 shows the overall structure of the information service system according to the embodiment of the present invention. This system is constructed of a host computer 101, and a plurality of remote units and terminals. The host computer 101 manages information which changes every moment and provides users with information services. Each remote unit contains a roll of information which is often repeated for a distributed processing (local processing) of inquiry/response. Each terminal inquires information regarding a plurality of items. A host data file 104 is connected to the host computer 101, and a remote data file 105 is connected to each remote unit 102. The data files 104 and 105 each are an external storage unit for storing information. The host computer 101 and each of the plurality of remote units are connected together by an inquiry/response line 106 and a unidirectional line 107. Information transmitted from the host computer on a single line is broadcasted to remote units 102 via a plurality of unidirectional lines 107 by a broadcasting unit 108. The host computer 101 has a host table managing section 122, a host database managing section 124, a timer 126, a counter 128, a host inquiry managing table 109 used when aggregating the number of inquiries for each item counted by each remote unit 102, and a host database 110 having the information of the host data file 104, the information being developed on a main storage. Similarly, each remote unit has a remote table managing section 132, a remote database managing section 134, a timer 136, a remote inquiry managing table 111 for managing inquiries from terminals 103 connected to the remote unit in concern, and a remote database 112.

FIG. 2 shows the details of the host inquiry managing table 109 of the host computer 101. This table 109 is a table used when aggregating the number of inquiries from all terminals for each of m data items. The data items are disposed in the descending order of inquiry count. Each inquiry content is composed of an inquiry count order 109a, a data item (code) 109b, a change occurring flag 109c ("1" represents a change, and "0" represents no change) representative of whether or not a change has occurred during a unit of time, an updated inquiry count 109d (Xnt), and totals 109e. The updated inquiry count Xnt indicates an occurrence frequency of inquiries of data item n (n=1 to m) at a time t. The total SUMt of the updated inquiry counts is given by:

$$SUM_t = \sum_{n=1}^{m} X_{nt}$$

FIG. 3 shows the details of the remote inquiry managing table 111 of the remote unit 102. This table 111 is composed of a data item (code) 111a, a service flag 111b representative of whether or not information of the data item in concern is on service, i.e., present in the data base 112 ("1" represents on-service, and "0" represents not on-service), and an inquiry count 111c.

Next, the operation of the information service system of the present invention will be described.

Figure 4:
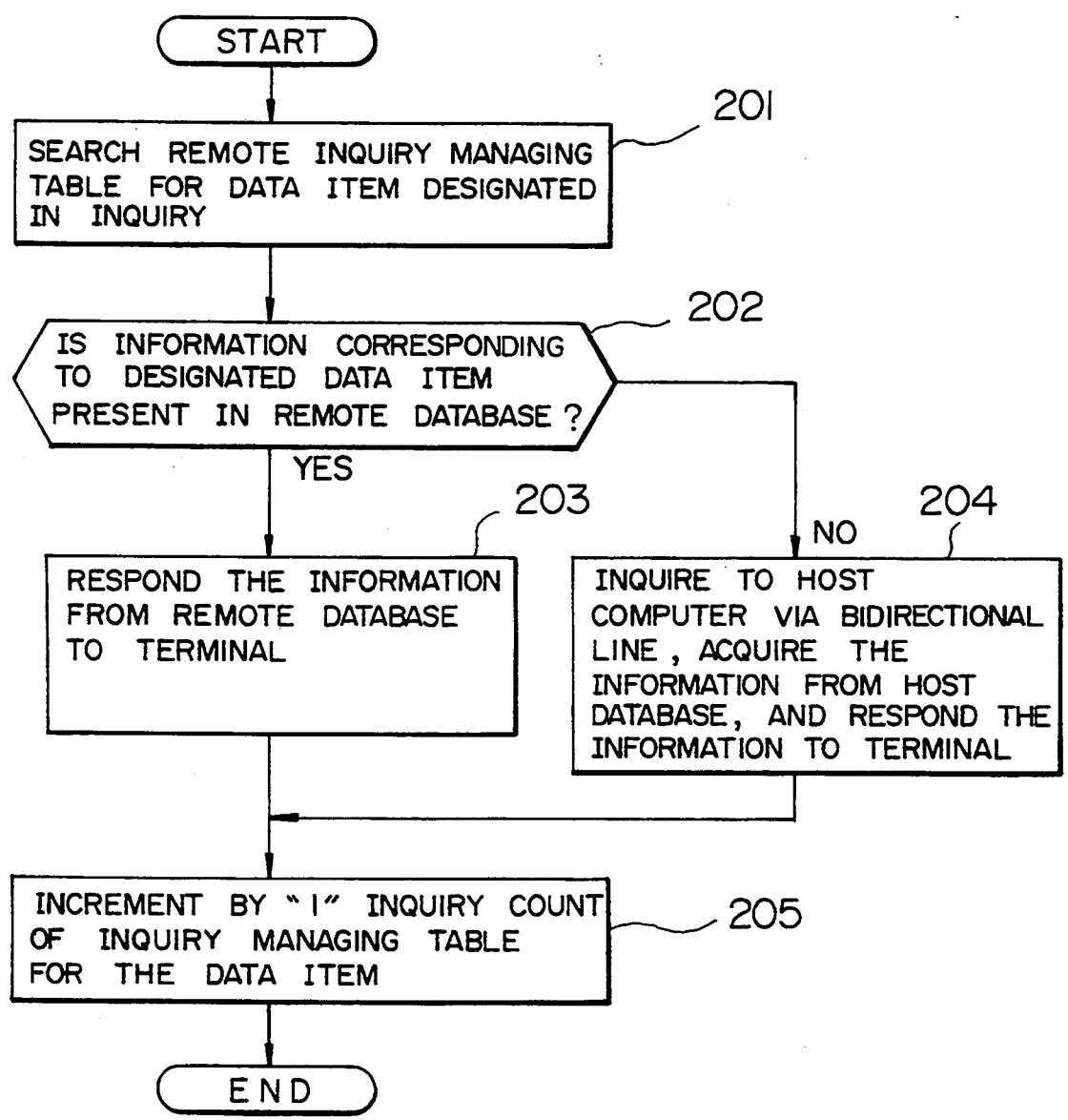
FIG. 4 is a flow chart illustrating the operation of processing an inquiry transaction at a remote unit.

FIG. 4 is a flow chart illustrating the operation of the remote unit 102 when an inquiry transaction occurs at a terminal 103. First, when an inquiry designating a data item is entered from the terminal 103, the remote unit 102 searches the intra-unit remote inquiry managing table 111 (step 201). At this time, the remote table managing section 132 refers to the flag 111b representative of whether or not the information of the designated data item is on service, i.e., present in the remote database 112, using the data item (code) 111a as a search key (step 202). If the information of the designated data item is on-service, i.e., if the information corresponding to the designated data item is present in the database 112, the remote database managing section 134 responds the information of the designated data item stored in the database 112 to the terminal 103 (step 203). If the information is not on-service, i.e., if the information corresponding to the designated data item is not present in the database 112, the section 132 transmits the inquiry to the host computer 101 via the inquiry/response line 106 to obtain the corresponding information from the host database 110, and the section 134 responds the information to the terminal 103 (step 204). Thereafter, on the side of the remote unit 102, the section 132 adds the designated data item to the table 111 and increments by "1" the value of the inquiry count 111c, and the section 134 adds the designated information to the database 112 (step 205).

Figure 5:
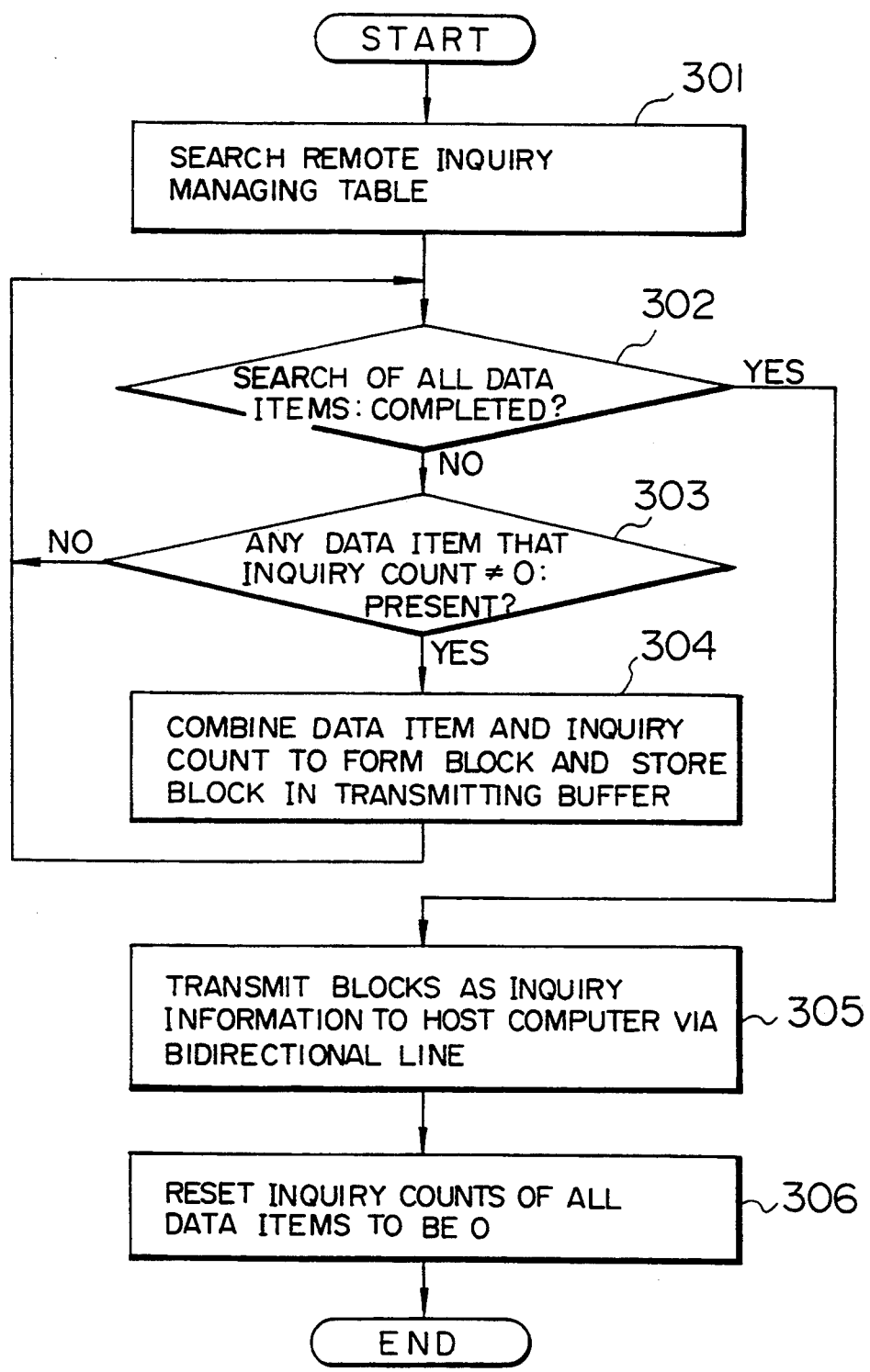
FIG. 5 is a flow chart illustrating the operation of transmitting the contents of the remote inquiry managing table to the host computer, the operation being executed by a remote unit.

FIG. 5 is a flow chart illustrating the operation of the section 132 of the remote unit 102 for transmitting the contents of the table 111 to the host computer 101. At the remote unit 102, the table 111 is searched at regular intervals of time counted by the timer 136, alternatively this search being carried out when the inquiry count reaches a predetermined number (step 301). Then, the data item 111a having an inquiry count other than "0" and its inquiry count are combined together to form a block which is stored in a transmitting buffer (steps 303 and 304). After search completion of all data items (step 302), the combined data or blocks are transmitted as inquiry information to the host computer 101 via the inquiry/response or bidirectional line 106 (step 305). Next, all inquiry counts 111c in the remote inquiry managing table 111 of the remote unit 102 are reset to "0" (step 306).

Figure 6:
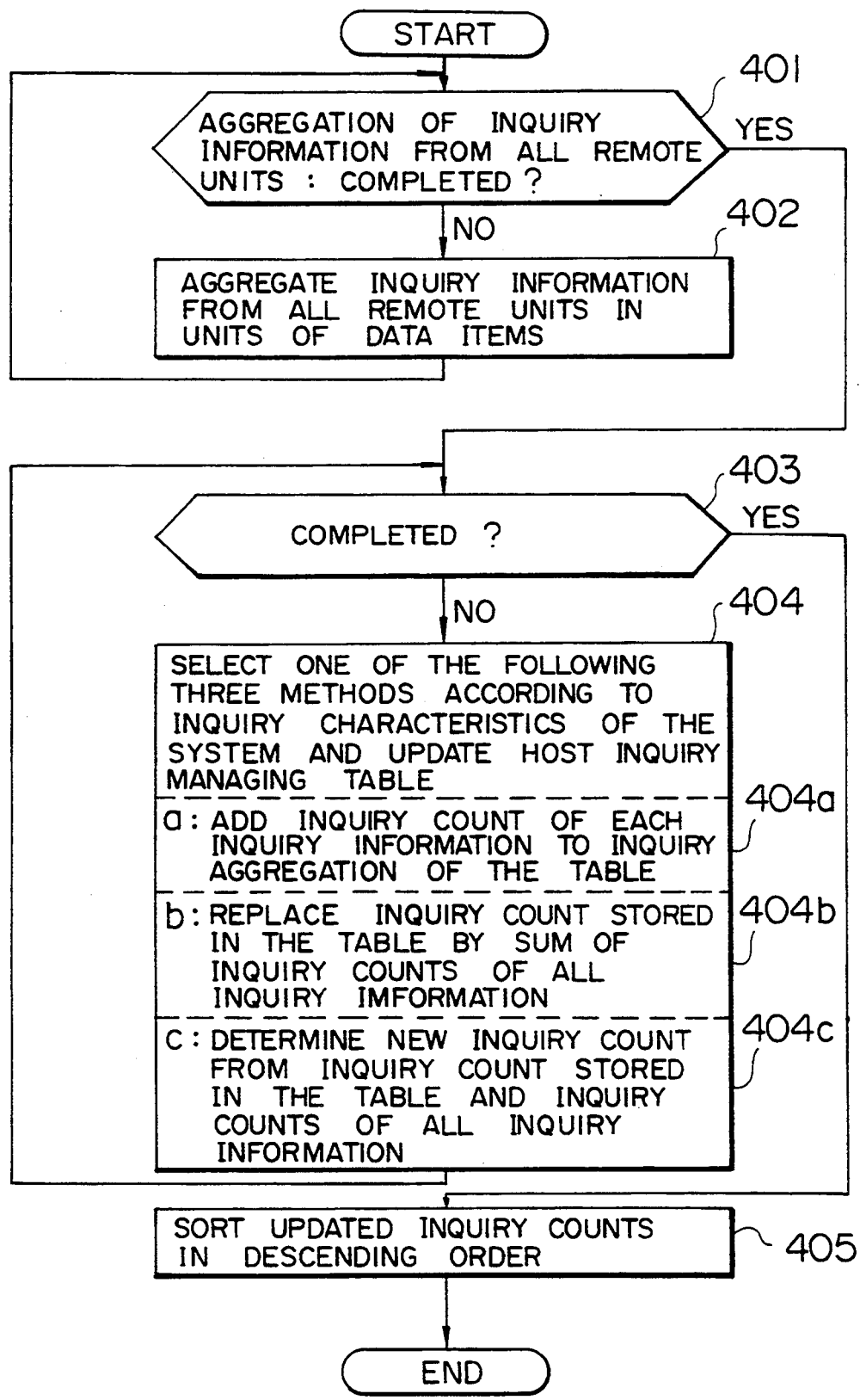
FIG. 6 is a flow chart illustrating the operation of forming the host inquiry managing table, the operation being executed by the host computer.

FIG. 6 is a flow chart illustrating the operation by the table managing section 122 of the host computer 101 for forming the host inquiry managing table upon reception of inquiry information transmitted from each remote unit 102.

Inquiry information sent from all the remote units are aggregated in units of data items (steps 401 and 402). When the inquiry information from all the remote units has been aggregated, the updated inquiry count 109d of the host inquiry/response managing table 109 is updated for each data item, by selecting one of the following three methods according to inquiry characteristics of the system (steps 403 and 404).

According to the first method, an inquiry count obtained during a predetermined time period through aggregation of inquiry information of all the remote units is added to the updated inquiry count 109d presently stored in the table 109 for each data item 109b (step 404a). Namely, with this method, an accumulated inquiry count including the past inquiry count is used as a new updated inquiry count 109d.

According to the second method, the updated inquiry count 109d presently stored in the table 109 is replaced by a newly obtained sum of latest inquiry counts (step 404b). Namely, with this method, a newly obtained sum of latest inquiry counts is set as the updated inquiry count 109d, abandoning the past inquiry counts.

According to the third method, a new inquiry count is determined from the updated inquiry count 109d presently stored in the table 109 and a newly obtained sum of latest inquiry counts (step 404c). Namely, with this method, the data items to be transmitted at the next unit time period are determined while considering to some extent the count of past inquires and considering seriously the tendency of latest inquiry count. The updated inquiry count $X_{nt+1}$ at the next unit time period is given, for example, by:

$$X_{nt+1} = C \cdot X_{nt} + (1-c) \cdot X_n$$

where
- t: certain time period,
- t+1: next time period,
- m: number of data items (1 to m),
- Xnt: updated inquiry count at the time period t for the data item n,
- Xn: a sum of latest inquiry counts obtained during a unit time period at all the remote units for the data item n, $$SUMt: \sum_{n=1}^{m} X_{nt}$$

$$SUM: \sum_{n=1}^{m} X_n$$

$$c: \frac{SUMt}{SUMt + sum}$$

Next, all updated inquiry counts 109d obtained for all the data items are sorted in descending order within the host inquiry managing table 109 (step 405). In the above manner, updating the table 109 is completed. The contents of the table 109 are arranged in descending order of inquiry count.

FIG. 7 is a flow chart illustrating the operation by the section 122 for broadcasting information from the host computer 101 to each remote unit 102 using the unidirectional lines 102 and the table 109. In the data transmission operation, the data amount to be transmitted is determined by the line capacity. In order to use the line as efficiently as possible, one of the following two methods is used. The first method transmits only changed information, and the second method transfers all information to a transmitting buffer but the information not transmitted during a unit time period is cleared. The more detailed description will be given below.

At the host computer 101, the timer 126 is reset, the counter 128 is reset to "0", and the transmitting buffer is cleared, the timer 126 measuring a unit time period (a maximum allowable delay time when a terminal refers to information which has changed) (step 501). This processing is repeated each time the timer 126 counts the unit time period (step 502). Next, the value n of the counter 128 is incremented by "1" (step 503). It is then determined if the information of the n-th data item stored in the table 109 has been changed or not, by checking if the change occurring flag 109c is "0" or "1" (step 504). The flag 109c stored in the table 109 is set to "1" when the data item stored in the database 110 has changed, in asynchronism with the processing shown in this flow chart. If there is no change, the n-th data item code with a changeless flag is transferred to the transmitting buffer and transmitted onto unidirectional lines 107 via the broadcasting unit 108 (step 505). If there is a change, the section 124 reads the changed information from the database 110, and the n-th data item code with the read-out information is transferred to the transmitting buffer and transmitted onto the unidirectional lines 107 (step 506). Thereafter, the change occurring flag 109c of the n-th data item stored in the table 109 is reset to "0" (step 507). The above processing is repeated until the timer counts the unit time period.

In each remote unit 102, the section 132 receives the information sequentially transmitted from the host computer 110, and the section 134 stores the received information in the remote database 112 and data file 105. At the same time, if the data item corresponding to the received data item code is not stored in the table 111, it adds the data item, and sets "1" (i.e., on-service) to its service flag 111b. If the data item is present in the table 111, the service flag 111b is set to "1" (step 508). A series of these processes is repeated until the information service is completed (step 509). As described with FIG. 4, upon reception of an inquiry from a terminal 103, the remote unit 102 searches the table 111, and when the service flag of the designated data item code is "1", the information corresponding to the inquiry is obtained from the database 112, and responded to the terminal 103.

In the foregoing description of the embodiment of the present invention, a terminal 103 may be provided with a function of a remote unit 102 in the system arrangement shown in FIG. 1, i.e. a terminal having a distributed processing function may be used, thereby allowing the omission of a remote unit 102.

In the above embodiment, information is unidirectionally transmitted from the host computer to each remote unit via a unidirectional line. The information may be transmitted via the inquiry/response line by including the information within a response message.

Furthermore, in the above embodiment, a remote unit transmits inquiry information to a host computer at regular time intervals. The information may be transmitted at a constant occurrence frequency of inquiries.

As seen from the foregoing description of the present invention, in the inquiry/response information service system, the host computer aggregates the contents of past inquiry transactions and those most recently occurred during a unit time period, to thereby estimate the contents of inquiry transactions occurring during the next unit time period. Service information having high occurrence frequencies of inquiries are transmitted in advance to a terminal side (such as a remote unit, a terminal having a distributed processing function). Therefore, it becomes possible to process an inquiry response locally at the terminal side, thereby reducing a load of the host computer for the response processing and improving the throughput of the whole system.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:
1. An information service system comprising:
   bidirectional communication paths;
   unidirectional paths;

a plurality of terminals, each of which generates an inquiry as a terminal inquiry associated with a target item of information and receives a remote response to said terminal inquiry to represent a remote response;

a plurality of remote units, each of which is connected to one or more of said terminals, a corresponding one of said bidirectional communication paths and a corresponding one of said unidirectional communication paths and includes a remote database for storing a plurality of first item information, wherein said remote units determine whether or not said target item of information is stored in said remote database, transmits said target item of information to said connected terminal as said remote response when it is determined that said target item of information is stored in said remote database and transmits said terminal inquiry, as said remote inquiry, on to said connected bidirectional communication path when it has been determined that said target item of information is not stored in said remote database, and transmits terminal inquiry counts on said connected bidirectional communication paths when a predetermined remote condition is satisfied; and a host connected to said bidirectional communication paths and said unidirectional communication paths, said host including a host database for storing a plurality of second items of information, for receiving said remote inquiry through said bidirectional communication paths to receive said target item of information from said host database, for transmitting said target item of information to one of said remote units which has transmitted said remote inquiry through said bidirectional communication paths which are connected to said remote unit, for receiving said terminal inquiry counts from said remote units through said bidirectional communication paths and for broadcasting items of information, through said unidirectional communication paths, selected from said second items of information based on inquiry frequencies determined in accordance with said terminal inquiry counts to said remote units, wherein each of said remote units include:

a remote inquiry count table for storing said terminal inquiry count for each of said first items of information; and remote table managing means for increasing said terminal inquiry count for said target item of information when said target item of information is stored in said remote database, for setting a terminal inquiry count of "1" for said target item of information in said remote inquiry count table when said target item of information is not stored in said remote database, for setting terminal inquiry counts of "0" for said selected items of information in said remote inquiry count table when said selected items of information are received from said host, for transmitting said terminal inquiry counts to said host when said remote condition is satisfied, and for resetting all of said terminal inquiry counts, and wherein one of said remote units receives said target item of information from said host to transmit said target item of information to said connected terminal and to store said target item of information in said remote database and receives selected items of information from said host to store said selected items of information in said remote database.

2. The information service system comprising:
bidirectional communication paths;
unidirectional paths;

a plurality of terminals, each of which generates an inquiry as a terminal inquiry associated with a target item of information and receives a remote response to said terminal inquiry to represent a remote response;

a plurality of remote units, each of which is connected to one or more of said terminals, a corresponding one of said by directional communication paths and a corresponding one of said unidirectional communication paths and includes a remote database for storing a plurality of first item information, wherein said remote units determine whether or not said target item of information is stored in said remote database, transmits said target item of information to said connected terminal as said remote response when it is determined that said target item of information is stored in said remote database and transmits said terminal inquiry, as said remote inquiry, on to said connected bidirectional communication path when it has been determined that said target item of information is not stored in said remote database, and transmits terminal inquiry counts on said connected bidirectional communication paths when a predetermined remote condition is satisfied; and a host connected to said bidirectional communication paths and said unidirectional communication paths, said host including a host database for storing a plurality of second items of information, for receiving said remote inquiry through said bidirectional communication paths to receive said target item of information from said host database, for transmitting said target item of information to one of said remote units which has transmitted said remote inquiry through said bidirectional communication paths which are connected to said remote unit, for receiving said terminal inquiry counts from said remote units through said bidirectional communication paths and for broadcasting items of information, through said unidirectional communication paths, selected from said second items of information based on inquiry frequencies determined in accordance with said terminal inquiry counts to said remove units, said host further comprises:

means for replacing a portion of said second items of information in said host database with new items of information:

host information managing table for storing flags for said second items of information;

means for broadcasting said selected items of information to said remote units together with set or reset flags; and means for setting said flag for new items of information, and for resetting said flags after said broadcasting, said remote unit includes means for replacing correponding one of said first items of information with said selected items of information with said set flags, wherein one of said remote units receives said target item of information from said host to transmit said target item of information to said connected terminal and to store said target item of information in said remote database and receives selected items of information from said host to store said selected items of information in said remote database.

3. The information service system comprising:
bidirectional communication paths;
unidirectional paths;
a plurality of terminals, each of which generates an inquiry as a terminal inquiry associated with a target item of information and receives a remote response to said terminal inquiry to represent a remote response;
a plurality of remote units, each of which is connected to one or more of said terminals, a corresponding one of said by directional communication paths and a corresponding one of said unidirectional communication paths and includes a remote database for storing a plurality of first item information, wherein said remote units determine whether or not said target item of information is stored in said remote database, transmits said target item of information to said connected terminal as said remove response when it is determined that said target item of information is stored in said remote database and transmits said terminal inquiry, as said remote inquiry, on to said connected bidirectional communication path when it has been determined that said target item of information is not stored in said remote database, and transmits terminal inquiry counts on said connected bidirectional communication paths when a predetermined remote condition is satisfied; and
a host connected to said bidirectional communication paths and said unidirectional communication paths, said host including a host database for storing a plurality of second items of information, for receiving said remote inquiry through said bidirectional communication paths to receive said target item of information from said host database, for transmitting said target item of information to one of said remote units which has transmitted said remote inquiry through said bidirectional communication paths which are connected to said remote unit, for receiving said terminal inquiry counts from said remote units through said bidirectional communication paths and for broadcasting items of information, through said unidirectional communication paths, selected from said second items of information based on inquiry frequencies determined in accordance with said terminal inquiry counts to said remote units,
said host further comprises:
means for replacing a portion of said second items of information in said host database with new items of information;
host information managing table for storing flags for said second items of information,
said host includes means for broadcasting said selected items of information to said remote units;
means for setting said flags for said new items of information, and for resetting said flags after said broadcasting; and
means for determining items of information having said set flags as said selected items of information among a portion of said second items of information determined in accordance with said inquiry frequencies, said remote unit includes means for replacing corresponding ones of said first items of information with said selected items of information with said selected items of information with said set flags,
wherein one of said remote units receives said target item of information from said host to transmit said target item of information to said connected terminal and to store said target item of information in said remote database and receives selected items of information from said host to store said selected items of information in said remote database.

4. The information service system comprising:
bidirectional communication paths;
unidirectional paths;
a plurality of terminals, each of which generates an inquiry as a terminal inquiry associated with a target item of information and receives a remote response to said terminal inquiry to represent a remote response;
a plurality of remote units, each of which is connected to one or more of said terminals, a corresponding one of said by directional communication paths and a corresponding one of said unidirectional communication paths and includes a remote database for storing a plurality of first item information, wherein said remote units determine whether or not said target item of information is stored in said remote database, transmits said target item of information to said connected terminal as said remote response when it is determined that said target item of information is stored in said remote database and transmits said terminal inquiry, as said remote inquiry, on to said connected bidirectional communication path when it has been determined that said target item of information is not stored in said remote database, and transmits terminal inquiry counts on said connected bidirectional communication paths when a predetermined remote condition is satisfied; and
a host connected to said bidirectional communication paths and said unidirectional communication paths, said host including a host database for storing a plurality of second items of information, for receiving said remote inquiry through said bidirectional communication paths to receive said target item of information from said host database, for transmitting said target item of information to one of said remote units which has transmitted said remote inquiry through said bidirectional communication paths which are connected to said remote unit, for receiving said terminal inquiry counts from said remote units through said bidirectional communication paths and for broadcasting items of information, through said unidirectional communication paths, selected from said second items of information based on inquiry frequencies determined in accordance with said terminal inquiry counts to said remote units,
wherein said host further includes:
a host inquiry count table for storing said inquiry frequencies for said second items of information;
host table managing means for updating said inquiry frequencies in said host inquiry count table in accordance with said terminal inquiry counts form each of said remote units,
wherein said host table managing means includes means for setting said terminal inquiry counts from each of said remote units as said inquiry frequencies in said host inquiry count table, and wherein one of said remote units receives said target item of information from said host to transmit said target item of information to said connected terminal and to store said target item of information in said remote database and receives selected items of information from said host to store said selected items of information in said remote database.

5. The information service system comprising:

bidirectional communication paths;

unidirectional paths;

a plurality of terminals, each of which generates an inquiry as a terminal inquiry associated with a target item of information and receives a remote response to said terminal inquiry to represent a remote response;

a plurality of remote units, each of which is connected to one or more of said terminals, a corresponsing one of said by directional communication paths and a corresponding one of said unidirectional communication paths and includes a remote database for storing a plurality of first item information, wherein said remote units determine whether or not said target item of information is stored in said remote database, transmits said target item of information to said connected terminal as said remote response when it is determined that said target item of information is stored in said remote database and transmits said terminal inquiry, as said remote inquiry, on to said connected bidirectional communication path when it has been determined that said target item of information is not stored in said remote database, and transmits terminal inquiry counts on said connected bidirectional communication paths when a predetermined remote condition is satisfied; and a host connected to said bidirectional communication paths and said unidirectional communication paths, said host including a host database for storing a plurality of second items of information, for receiving said remote inquiry through said bidirectional communication paths to receive said target item of information from said host database, for transmitting said target item of information to one of said remote units which has transmitted said remote inquiry through said bidirectional communication paths which are connected to said remote unit, for receiving said terminal inquiry counts from said remote units through said bidirectional communication paths and for broadcasting items of information, through said unidirectional communication paths, selected from said second items of information based on inquiry frequencies determined in accordance with said terminal inquiry counts to said remote units, wherein said host further includes:

a host inquiry count table for storing said inquiry frequencies for said second items of information;

host table managing means for updating said inquiry frequencies in said host inquiry count table in accordance with said terminal inquiry counts from each of said remote units, wherein said host table managing means includes means for setting adding results of said inquiry frequencies and said terminal inquiry counts from each of said remote units as said inquiry frequencies in said host inquiry count table, and wherein one of said remote units receives said target item of information from said host to transmit said target item of information to said connected terminal and to store said target item of information in said remote database and receives selected items of information from said host to store said selected items of information in said remote database.

6. The information service system comprising:

bidirectional communication paths;

unidirectional paths;

a plurality of terminals, each of which generates an inquiry as a terminal inquiry associated with a target item of information and receives a remote response to said terminal inquiry to represent a remote response;

a plurality of remote units, each of which is connected to one or more of said terminals, a corresponding one of said by directional communication paths and a corresponding one of said unidirectional communication paths and includes a remote database for storing a plurality of first item information, wherein said remote units determine whether or not said target item of information is stored in said remote database, transmits said target item of information to said connected terminal as said remote response when it is determined that said target item of information is stored in said remote database and transmits said terminal inquiry, as said remote inquiry, on to said connected bidirectional communication path when it has been determined that said target item of information is not stored in said remote database, and transmits terminal inquiry counts on said connected bidirectional communication paths when a predetermined remote condition is satisfied; and a host connected to said bidirectional communication paths and said unidirectional communication paths, said host including a host database for storing a plurality of second items of information, for receiving said remote inquiry through said bidirectional communication paths to receive said target item of information from said host database, for transmitting said target item of information to one of said remote units which has transmitted said remote inquiry through said bidirectional communication paths which are connected to said remote unit, for receiving said terminal inquiry counts from said remote units through said bidirectional communication paths and for broadcasting items of information, through said unidirectional communication paths, selected from said second items of information based on inquiry frequencies determined in accordance with said terminal inquiry counts to said remote units, wherein said host further includes:

a host inquiry count table for storing said inquiry frequencies for said second items of information;

host table managing means for updating said inquiry frequencies in said host inquiry table in accordance with said terminal inquiry counts from each of said remote units, wherein said host table managing means includes means for weighting said inquiry frequencies and said terminal inquiry counts from each of said remote units and for setting adding results of said weighted inquiry frequencies and said weighted terminal inquiry counts as said inquiry frequencies in said host inquiry count table, and wherein one of said remote units receives said target item of information from said host to transmit said target item of information to said connected terminal and to store said target item of information in said remote database and receives selected items of information from said host to store said selected items of information in said remote database.

* * * * *